(12) United States Patent
Van de Ven (10) Patent No.: US 8,590,420 B2
(45) Date of Patent: Nov. 26, 2013

(54) FLUIDIC VARIABLE INERTIA FLYWHEEL AND FLYWHEEL ACCUMULATOR SYSTEM

(75) Inventor: James D. Van de Ven, Paxton, MA (US)

(73) Assignee: Worcester Polytechnic Institute, Worcester, MA (US)

( * ) Notice: Subject to any disclaimer, the term of this patent is extended or adjusted under 35 U.S.C. 154(b) by 0 days.

(21) Appl. No.: 13/185,681

(22) Filed: Jul. 19, 2011

(65) Prior Publication Data

US 2012/0011960 A1    Jan. 19, 2012

Related U.S. Application Data

(60) Provisional application No. 61/365,464, filed on Jul. 19, 2010.

(51) Int. Cl.
*F16F 15/173*   (2006.01)
(52) U.S. Cl.
USPC ..................... 74/573.1; 74/573.12
(58) Field of Classification Search
USPC ........ 74/573.11, 573.1, 572.2, 572.11, 572.1, 74/572.4; 180/165; 903/960; 60/469; 92/54; 123/192.1
See application file for complete search history.

(56) References Cited

U.S. PATENT DOCUMENTS

| | | | | |
|---|---|---|---|---|
| 3,812,724 A | * | 5/1974 | Curtz et al. | 73/458 |
| 3,921,898 A | * | 11/1975 | Finkel | 494/26 |
| 4,466,245 A | * | 8/1984 | Arold | 60/415 |
| 4,615,096 A | * | 10/1986 | Foster | 29/434 |
| 4,905,807 A | * | 3/1990 | Rohs et al. | 192/61 |
| 5,415,061 A | * | 5/1995 | Kohno | 74/573.11 |
| 5,614,777 A | * | 3/1997 | Bitterly et al. | 310/74 |
| 6,487,957 B2 | * | 12/2002 | Colimitra | 92/54 |
| 6,883,399 B2 | * | 4/2005 | Burstall | 74/573.1 |
| 7,611,440 B1 | * | 11/2009 | Barr | 477/3 |
| 2009/0320640 A1 | * | 12/2009 | Elliott et al. | 74/572.21 |
| 2010/0018196 A1 | * | 1/2010 | Li et al. | 60/415 |

OTHER PUBLICATIONS

Li, Van de Ven, Snacken; Open Accumulator Concept for Compact Fluid Power Storage; Proceedings of IMECE; ASME 2007 International Mechanical Engineering Congress and R&D Exposition.*
Moosavi; A BVIF-integrated hybrid bus; Proceedings of the Instiution of Mechanical Engineers; Part D, Journal of Automobile Engineering; vol. 209.*
Van de Ven; Fluidic Variable Inertia Flywheel; Worcester Polytechnic Institute.*
Harrowell; Elastomer Flywheel Energy Storage; International Journal of Mechanical Sciences; vol. 36.*
Van de Ven and McInnis; Design and Experimental Results of a Bench Top Flyhweel-Accumulator for Compact Energy Storage; Worcester Polytechnic Institute.*
Definition of Passive from Dictionary.com, obtained Mar. 27, 2013.*

* cited by examiner

*Primary Examiner* — James Pilkington
*Assistant Examiner* — Brian McGovern
(74) *Attorney, Agent, or Firm* — Burns & Levinson LLP; Jacob N. Erlich (57) ABSTRACT

A self-governing fluidic variable inertia flywheel that can maintain a constant angular velocity is disclosed. The flywheel uses a movable member to separate a liquid filled chamber from a gas occupying chamber. In one embodiment, a self-governing fluidic variable inertia flywheel includes a container having an internal volume and a movable member disposed within the container such that the internal volume is separated into a first chamber and a second chamber containing a fluid. The movable member is responsive to changes in angular velocity of the fluid.

10 Claims, 8 Drawing Sheets

FLUIDIC VARIABLE INERTIA FLYWHEEL AND FLYWHEEL ACCUMULATOR SYSTEM

CROSS REFERENCE TO RELATED APPLICATIONS

This application claims priority to U.S. Provisional Application No. 61/365,464, filed on Jul. 19, 2010, and entitled FLUIDIC VARIABLE INERTIA FLYWHEEL.

BACKGROUND OF THE INVENTION

Energy storage is important for many applications from hybrid vehicles to off-peak electric power to rotating machinery. A flywheel offers the combination of high energy density and high power density not attainable with other energy storage medium. Numerous applications utilize flywheels, typically either for purely storing energy or for the purpose of minimizing the angular velocity fluctuation of a shaft. Examples of energy storage applications include flywheel hybrid vehicles, uninterrupted power supplies, cyclic alternative energy sources such as wind turbines, and space power systems. Applications utilizing a flywheel for smoothing angular velocity fluctuations include an internal combustion engine, industrial machinery such as camshafts, and AC generators. In the design of a system with a conventional flywheel used to minimize changes in angular velocity, the flywheel is sized for an allowable coefficient of fluctuation, defined as the change in angular velocity during a cycle divided by the average angular velocity. To achieve a low coefficient of fluctuation, a flywheel with a large moment of inertia is required.

From the equation for the kinetic energy storage of a flywheel, $$E = \frac{1}{2}I\omega^2,$$

where I is the mass moment of inertia and $\omega$ is the angular velocity, it can be noted that a change in energy can be accommodated with a change in the angular velocity, as in a conventional flywheel, or through a change in the moment of inertia. Utilizing a variable inertia flywheel theoretically enables a zero coefficient of fluctuation with a smaller and lighter flywheel. Alternatively, a variable inertia flywheel can eliminate the need for a continuously variable transmission between the flywheel and the load. The inertia of a flywheel can be changed in multiple ways including moving mechanical masses, allowing the flywheel material to strain, and the like.

In many situations, it is desirable to store energy at a constant angular velocity. One of the earliest variable inertia flywheels was the flyball governor by James Watt. Other moving mass variable inertia flywheels include designs using sliding masses on tracks and band-type variable inertia flywheels (BVIF). The BVIF uses a thin metal band wrapped between an inner and outer drum. By changing the angular difference between the inner and outer hubs, the wrappings of the band are transferred between the two drums. To create this angular difference between the two hubs, attempts to recirculate power from the flywheel using a planetary gear train were made.

Instead of moving fixed masses through mechanical means, another method of creating a variable inertia flywheel is to allow the centripetal acceleration of the flywheel create strain in the material. Due to the non-linear stress-strain relationship of specific elastomers, approximately 80% of the stored energy in the system can be extracted at a nearly constant angular velocity. However, due to the limited strength of elastomeric materials with the required stress-strain behavior, the energy density of the flywheel is significantly limited.

Variable inertia flywheels may be applied in various applications, such as hydraulic energy storage applications. Hydraulic energy storage is important to numerous applications including hydraulic hybrid vehicles and alternative energy sources such as wind turbines. Hydraulic energy is typically stored in a hydraulic accumulator, which is typically a pressure vessel containing a gas that is compressed by the addition of hydraulic oil to the pressure vessel. The energy storage density of hydraulic accumulators is significantly lower than other energy storage mediums. The consequence of this for applications such as hydraulic hybrid vehicles is a concession in the energy storage capacity based on packaging and weight considerations. The limited energy storage is a barrier to technologies such as "plug-in" hydraulic hybrid vehicles that can operate for a considerable distance solely on energy storage.

Previous research on improving the energy density of hydraulic accumulators has primarily focused on isothermalizing the compression and expansion of the gas in the accumulator and adding foam or fine metallic strands to the gas volume. These approaches have provided incremental increases in the energy density of hydraulic accumulators, yet the energy density is still orders of magnitude lower than competing technologies.

BRIEF SUMMARY OF THE INVENTION

The present embodiments are directed towards technologies for a self-governing fluidic variable inertia flywheel that can maintain a constant angular velocity. In addition, technologies for integrating the self-governing fluidic variable inertia flywheel with a hydraulic accumulator to build and operate a flywheel accumulator system are also presented herein.

In one embodiment, a self-governing fluidic variable inertia flywheel includes a container having an internal volume and a movable member disposed within the container such that the internal volume is separated into a first chamber and a second chamber configured to contain a fluid. The movable member is passively responsive to changes in angular velocity of the fluid.

In another embodiment, a method for maintaining constant angular velocity of fluid within a flywheel assembly includes adjusting an angular velocity of the flywheel assembly which includes a container having a first chamber containing a gas and a second chamber containing a fluid. The second chamber is separated from the first chamber by a movable member disposed within the container. The position of the movable member can adjust towards the first chamber when the angular velocity of the flywheel assembly increase and the position of the movable member can passively adjust towards the second chamber when the angular velocity of the flywheel assembly decreases.

DETAILED DESCRIPTION OF THE INVENTION

Numerous applications utilize flywheels, typically either for purely storing energy or for the purpose of minimizing the angular velocity fluctuation of a shaft. Examples of energy storage applications include, but are not limited to, flywheel hybrid vehicles, uninterrupted power supplies, cyclic alternative energy sources such as wind turbines, and space power systems. Applications utilizing a flywheel for smoothing angular velocity fluctuations include, but are not limited to, an internal combustion engine, industrial machinery such as camshafts, and AC generators. In the design of a system with a conventional flywheel used to minimize changes in angular velocity, the flywheel is sized for an allowable coefficient of fluctuation, defined as the change in angular velocity during a cycle divide by the average angular velocity. To achieve a low coefficient of fluctuation, a flywheel with a large moment of inertia is required.

From the equation for the kinetic energy storage of a flywheel, $$E = \tfrac{1}{2}I\omega^2,$$

where I is the mass moment of inertia and ω is the angular velocity, it can be noted that a change in energy can be accommodated with a change in the angular velocity, as in a conventional flywheel, or through a change in the moment of inertia. Utilizing a variable inertia flywheel theoretically enables a zero coefficient of fluctuation with a smaller and lighter flywheel. Alternatively, a variable inertia flywheel can eliminate the need for a continuously variable transmission between the flywheel and the load. The inertia of a flywheel can be changed in multiple ways including moving mechanical masses, allowing the flywheel material to strain, or adding fluid to the flywheel.

The present embodiments will be more completely understood through the following description, which should be read in conjunction with the attached drawings. In this description, like numbers refer to similar elements within various embodiments of the present invention. Within this description, the claimed invention will be explained with respect to embodiments. The skilled artisan will readily appreciate that the methods and systems described herein are merely exemplary and that variations can be made without departing from the spirit and scope of the invention.

Figure 1:
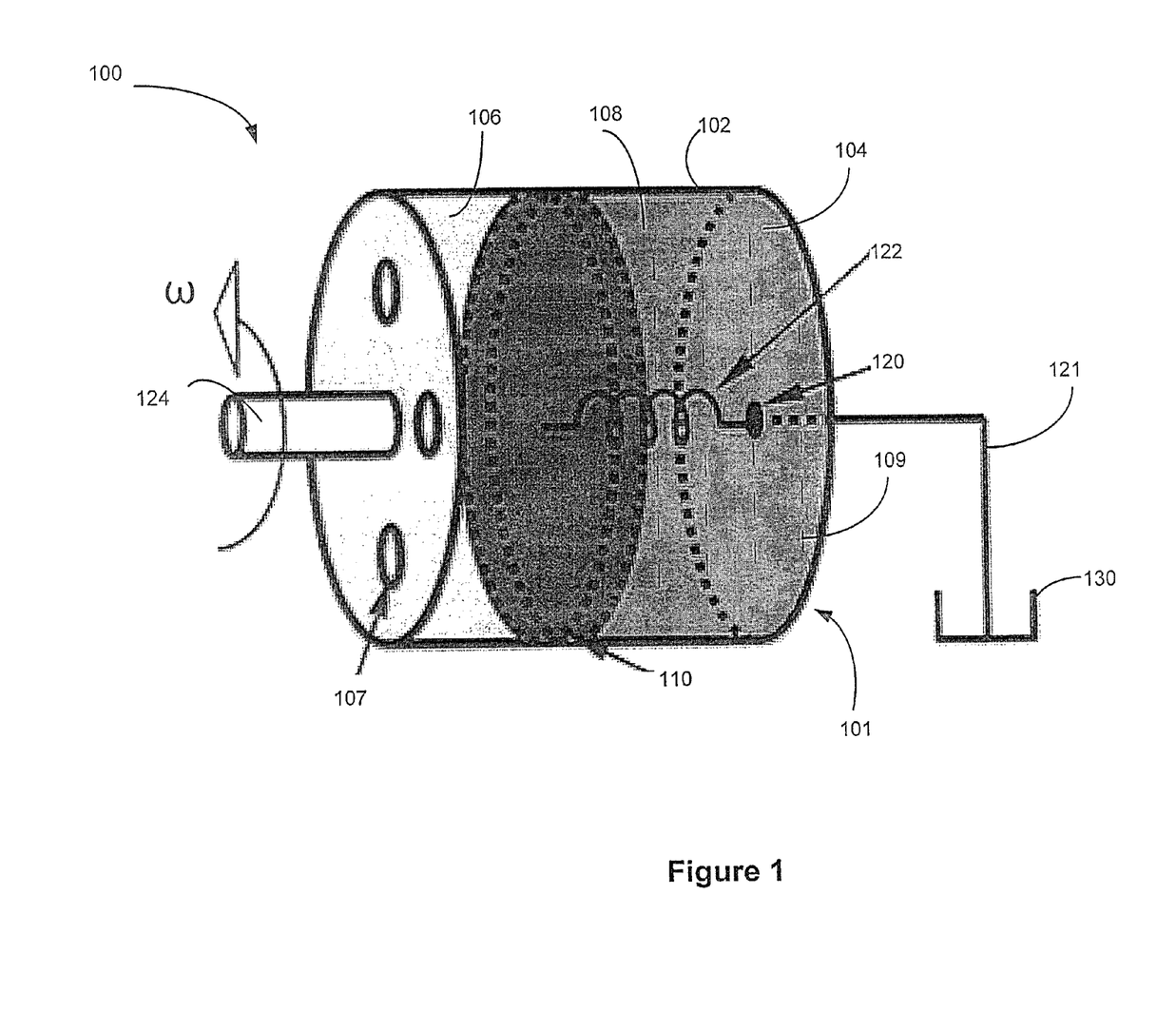
FIG. 1 illustrates a pictorial representation of a self-governing fluidic variable inertia flywheel system, in accordance with various embodiments of the present invention.

Referring now to the figures, FIG. 1 illustrates a pictorial representation of a self-governing fluidic variable inertia flywheel system, in accordance with various embodiments of the present disclosure. A self-governing fluidic variable inertia flywheel system 100 may include a self-governing fluidic variable inertia flywheel 101 including a vessel 102 or container having an internal volume 104. A movable piston 110 or member disposed within the cylindrical vessel 102 divides the internal volume 104 into a first chamber 106 and a second chamber 108. The first chamber 106 may be configured to vent to atmosphere via vent outlets 107, while the second chamber 108 may be filled with a varying volume of liquid 109. The liquid 109 is allowed to move freely between the second chamber 108 and a tank 130, via a port 120 and line 121. In various embodiments, the liquid 109 may move freely at atmospheric pressure. In addition, a resilient member 122, such as, but not limited to, a constant force spring, shown as a tension spring, may be disposed within the cylindrical vessel 102. The resilient member 122 may apply a force to the piston 110 in the direction of the second chamber 108. A shaft 124 may be attached to the cylindrical vessel 102 and configured to rotate the cylindrical vessel 102. It should be appreciated that the resilient member 122 may be a non-limiting example of a biasing means. The biasing means may bias the piston to an equilibrium position by exerting opposing forces on opposite sides of the piston 110.

Figure 2:
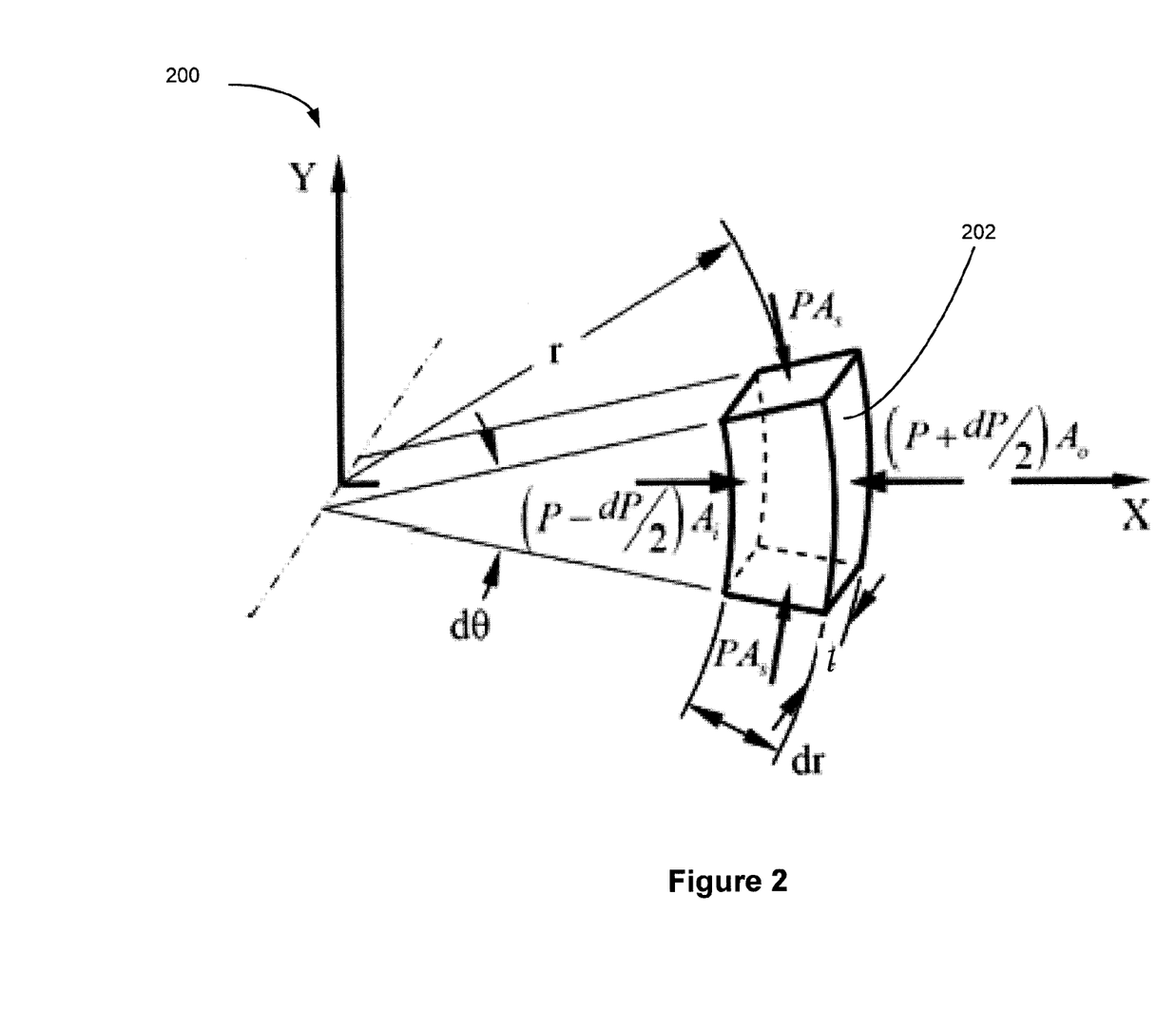
FIG. 2 illustrates a pictorial representation of a of an infinitesimal element of the hydraulic fluid subject to centripetal acceleration in the flywheel system, in accordance with various embodiments of the present invention.

Referring now to FIG. 2, a pictorial representation of an infinitesimal element of the hydraulic fluid subject to centripetal acceleration in the flywheel system is shown. When the flywheel 101 is rotating, the liquid 409 within the flywheel 101 is subjected to centripetal acceleration. This acceleration creates a radial pressure distribution within the liquid 109. To aid in developing the equations to describe this pressure distribution, a free-body-diagram 200 of an infinitesimal liquid element 202 is shown.

Starting from Newton's second law, and assuming steady-state operation and a constant density of the liquid, the force balance along the positive X-axis is described by:

$$\Sigma F_x = ma \qquad (1)$$

where the forces are due to the pressure acting on each side of the infinitesimal liquid volume, m is the mass of the fluid volume, and a is the centripetal acceleration of the fluid volume. Note that during transient operation, tangential, coriolis, and sliding acceleration are also present. Substituting the forces on the liquid volume yields $$\left(P - \frac{dP}{2}\right)A_i - \left(P + \frac{dP}{2}\right)A_o + 2PA_s\frac{d\theta}{2} = ma \qquad (2)$$

where P is the liquid pressure, dP is the change in pressure across the element, dθ is the arc angle of the volume element, $A_i$ is the area of the volume element on the inner radius, $A_o$ is the area of the liquid element on the outer radius, and $A_s$ is the area of the top and bottom sides of the element. Note that the sine of a small angle, $$\frac{d\theta}{2},$$

has been substituted by the angle. Substituting the area of the surfaces into Equation (2) yields:

$$\left(P - \frac{dP}{2}\right)\left(r - \frac{dr}{2}\right)d\theta \cdot l - \left(P + \frac{dP}{2}\right)\left(r + \frac{dr}{2}\right)d\theta \cdot l + 2Pdr \cdot l\frac{d\theta}{2} = \rho V(-\omega^2 r) \quad (3)$$

where r is the radius to the center of the element, dr is the radial length of the element, l is the thickness of the element, ρ is the mass density of the liquid, V is the volume of the element, and ω is the angular velocity of the flywheel. The volume of the element can be expressed as:

$$V = rd\theta dr \cdot l. \quad (4)$$

Expanding and simplifying Equation (3) yields:

$$dP = \rho\omega^2 r dr. \quad (5)$$

Taking the integral of both sides:

$$\int_{P_I}^{P} dP = \int_0^r \rho\omega^2 r\, dr \quad (6)$$

where $P_I$ is the liquid pressure at the inlet where r=0, yields an equation for the pressure of the liquid as a function of the radius:

$$P(r) = \frac{\rho\omega^2 r^2}{2} + P_I \quad (7)$$

As described above, the liquid inlet or port 120 on the flywheel 101 is directly connected to the tank 130 that is vented to atmosphere. Note that the tank 130 may be assumed to be at the same elevation as the port 120, allowing the influence of gravity to be neglected. Because the inlet liquid pressure is held constant, Equation (7) shows that a slight increase in the angular velocity will increase the fluid pressure away from the center of the flywheel 101. The increase in fluid pressure creates an imbalance of force acting on the piston 110, causing the piston 110 to move to the left, or in other words, towards the first chamber 106 and allow more liquid 109 into the flywheel 101. The addition of liquid to the flywheel 101 increases the mass moment of inertia, causing a decrease in the angular velocity due to conservation of momentum and thus the force on the piston 110 returns to an equilibrium condition. During this process, the energy added to the system 100 is stored in deflecting the resilient member 122 and increasing the kinetic energy of the flywheel 101. This self-regulating process results in a substantially constant angular velocity, which may be set by the force of the resilient member 122.

Figure 3:
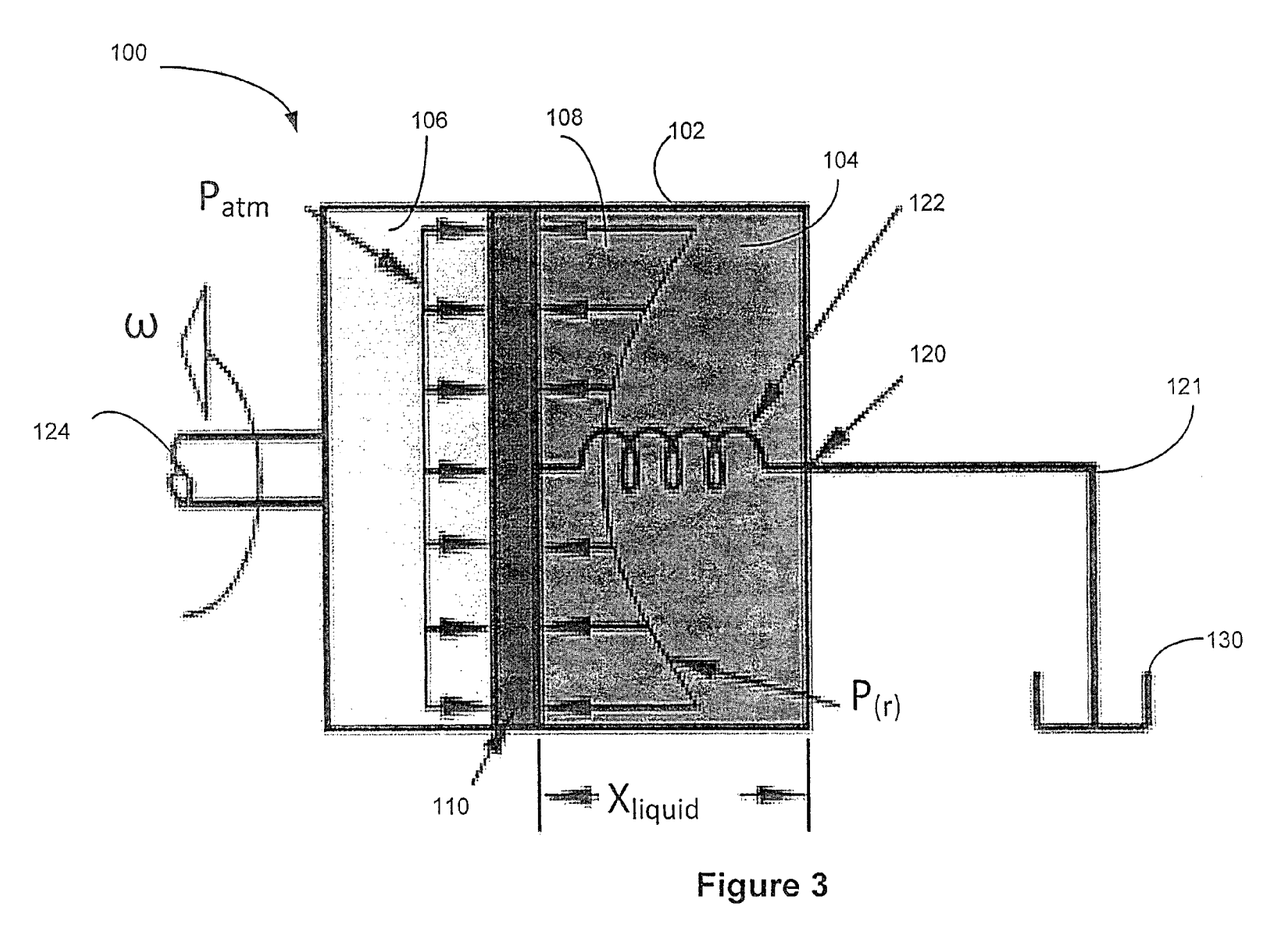
FIG. 3 illustrates a pictorial representation showing pressure distributions of the gas and hydraulic fluid in the flywheel system, in accordance with various embodiments of the present invention.

Referring now also to FIG. 3, which illustrates a pictorial representation showing pressure distributions of the gas and hydraulic fluid in the flywheel 101. The forces are comprised of the parabolic pressure distribution of the liquid 109, described by Equation (7), acting across the surface area of the piston 110, the force of the resilient member 122, and the force created by atmospheric pressure acting on the left side of the piston 110 that is exposed to the first chamber 106.

The forces on the piston 110 must be equal for the piston 110 to be in equilibrium, as described by:

$$\int P(r)dA = \int_0^{r_o}\left(\frac{\rho\omega^2 r^2}{2} + P_I\right)(2\pi r dr) = F_{spring} + P_{atm}\pi r_o^2 \quad (8)$$

where $r_o$ is the outer radius of the flywheel piston 110, $F_{spring}$ is the force of the constant force spring 122, and $P_{atm}$ is atmospheric pressure. Integrating and recognizing that $P_I$ is equal to atmospheric pressure due to the tank 130 being vented to atmosphere, yields the angular velocity of the flywheel 101 during equilibrium for a given spring force, liquid density, and flywheel radius:

$$\omega = \sqrt{\frac{4F_{spring}}{\pi\rho r_o^4}}. \quad (9)$$

It is important to note that the equilibrium of piston, described by Equation (9), is independent of the position of the piston 110, or in other words, the inertia of the flywheel 101. If a slight perturbation is created in the angular velocity, a force imbalance on the piston 110 will occur, which results in movement of the piston 110 and a corresponding change in the moment of inertia. Due to conservation of angular momentum, a change in the moment of inertia will inversely change the angular velocity, re-establishing equilibrium. It should be appreciated that the movement of the piston is passive, which means there is no external actuation mechanism that moves the piston 110. Rather, the piston moves as a result of the difference in forces acting on the piston 110. Accordingly, the flywheel system is self-governing due to the passive nature of the piston's movement.

The mass moment of inertia of the flywheel includes the inertia of the empty flywheel and the inertia of the liquid in the flywheel. Again, assuming the density of the liquid is constant with radius, the mass moment of inertia is described by:

$$I = I_{flywheel} + I_{liquid} = I_{flywheel} + \frac{mr_o^2}{2} \quad (10)$$

where $I_{flywheel}$ is the inertia of the empty flywheel, $I_{liquid}$ is the inertia of the liquid, and m is the mass of the liquid in the flywheel. Substituting for the mass of the liquid in terms of the density and volume yields:

$$I = I_{flywheel} + \frac{\pi\rho x_{liquid} r_o^4}{2}. \quad (11)$$

where $x_{liquid}$ is the axial length of the liquid volume.

There are two energy storage mediums in the presented fluidic flywheel: the kinetic energy of the flywheel 101 and the potential energy of the resilient member 122 or constant force spring. As presented earlier, the total energy stored by the flywheel 101 is:

$$E_{flywheel} = \frac{1}{2}I\omega^2 = \frac{1}{2}\left(I_{flywheel} + \frac{\pi\rho x_{liquid} r_o^4}{2}\right)\omega^2. \quad (12)$$

Expanding and substituting the equation for the angular velocity during equilibrium, Equation (9), yields:

$$E_{flywheel} = \frac{1}{2}I_{flywheel}\omega^2 + F_{spring}x_{liquid}. \quad (13)$$

The total energy stored in the constant force spring 122 is simply:

$$E_{spring} = F_{spring} x_{spring} \tag{14}$$

where the displacement of the spring, $X_{spring}$, is equal to the axial length of the liquid in the flywheel, $x_{liquid}$.

Energy is added or removed from the flywheel system 100 by applying a torque to the shaft 124 of the flywheel 101. By recognizing that the angular velocity of the flywheel 101 remains substantially constant due to the self-governing behavior, the first term of Equation (13) remains constant as energy is added or removed from the system 100. Thus, energy added to the system 100 is stored in increasing the potential energy of the spring 122, Equation (14), and increasing the inertia of the flywheel 101, the second term of Equation (13). It can be further noted that the change in energy stored in these two mediums is equal and described by the force of the spring 122 multiplied by the axial travel of the piston 110, which is equal to the displacement of the spring 122. Described in other terms, for a given energy input to the system, half is stored in increasing the kinetic energy of the flywheel and the other half is stored in increasing the potential energy of the spring.

Design Example

To illustrate further the behavior of the constant velocity fluidic flywheel, an example is presented. Consider a portable AC electric generator utilizing an internal combustion engine as a prime mover. To produce 60 Hz AC frequency, the single-cylinder engine must operate continuously at 3600 rpm (377 rad/s). Due to the gas torque and shaking torque of the engine, the engine torque fluctuates significantly over the two full crankshaft revolutions of a four-stroke cycle. By integrating the torque function with respect to the average torque for two full crankshaft revolutions, the maximum change in energy can be found. Following the method described by Norton, the required moment of inertia of a fixed inertia flywheel for a given angular velocity and a desired coefficient of fluctuation is:

$$I = \frac{E}{k\omega_{avg}^2} \tag{15}$$

where E is the energy variation associated with the largest torque pulse, k is the coefficient of fluctuation, and $\omega_{avg}$ is the average angular velocity of the shaft.

For a 200 cc four-stroke single-cylinder engine operating at 3600 rpm, the energy fluctuation during the maximum torque pulse is approximately 350 J. Using a coefficient of fluctuation of 0.02, the required inertia of the flywheel, from Equation (15), is 0.123 kg·m². If the flywheel is made of a solid steel disc and the radius is set equal to the thickness, the diameter would be 0.2 m and the thickness would be 0.1 m. The flywheel would have a mass of 24.7 kg.

The fixed inertia flywheel could be replaced with a fluidic self-governing variable inertia flywheel 101 to achieve theoretically zero angular velocity fluctuation. As previously discussed, the change in energy of the flywheel system 100 is:

$$\Delta E = 2 F_{spring} \Delta x_{spring}. \tag{16}$$

By solving Equation (9) for the spring force and substituting into Equation (16), the maximum energy variation can be solved for in terms of the geometry, angular velocity, and fluid density. By again setting the radius equal to the length, in this case $\Delta x_{spring}$, and using water as the liquid 109, the diameter of the liquid volume would be 0.138 m and the axial length would be 0.069 m. Additional size would be added for the cylindrical shell of the flywheel 101 and the piston 110. For reference, the mass of the liquid in the flywheel when full would be 1.0 kg. The cylindrical vessel 102 or shell of the flywheel 101 would not need to be very thick as the pressure exerted by the water on the outer radius, from Equation (7), is only 812 kPa (118 psi). The required spring force for this situation is 2.5 kN.

The above example demonstrates that a self-governing fluidic variable inertia flywheel 101 can replace a fixed inertia flywheel. The fluidic variable inertia flywheel 101 is capable of absorbing and releasing the required energy with no change in angular velocity with an order of magnitude lower mass than a steel flywheel with a 2% coefficient of fluctuation. It does need to be noted that the example did not include the design of the fluidic flywheel shell 102; however, the pressure exerted by the liquid 109 on the outer perimeter is quite low, allowing the use of a relatively thin walled shell 102.

When the energy in the flywheel 101 is either above or below the constant angular velocity operation zone, determined by being either completely empty or full of liquid, the flywheel 101 acts as a fixed inertia flywheel. As demonstrated in the results of the example, the moment of inertia of the fluidic flywheel 101 when empty or full is significantly less than the fixed inertia flywheel. The result of the lower inertia is that less energy is required to bring the system up to the operating angular velocity, and similarly less energy is required to stop the system, which is important for emergency stop situations.

When operating in the constant angular velocity zone, the energy is stored in increasing the kinetic energy of the flywheel 101 and increasing the potential energy of the constant force spring 122. The energy stored in both of these forms is equal, meaning that the work done by the spring 122 to change the inertia of the system 100 is equal to half of the input energy. The work done by the spring 122 is analogous to the work performed by a spinning figure skater pulling in their limbs to decrease their moment of inertia to increase the rate of spin.

To create a force on the piston 110 opposing the pressure of the liquid 109, a constant force spring 122 may be used. In some situations, a conventional constant force spring may not offer sufficient force to achieve the desired angular velocity. Another option to create an approximate constant force is to use gas pressure, as described in additional detail with respect to FIG. 4. A pre-charged gas reservoir could be connected to the left side of the piston 110 to create an opposing force. If the volume of the reservoir were significantly larger than the change in volume of the liquid 109 in the flywheel 101, the change in gas pressure would be small. It should be recognized that any change in force would result in a variation in the angular velocity during operation. A potential benefit of using an external gas reservoir is that changing the gas pressure would allow external variation of the angular velocity.

As a torque is applied to the flywheel, there will be a tendency for rotation of the fluid relative to the shell of the flywheel. The fluid shearing due to fluid swirl would create heat and thus an energy loss. This fluid motion can be minimized by using baffles inside the flywheel. To allow movement of the piston 110, the baffles (not shown) could be designed to interlock with the end of the flywheel or have a telescoping design.

The fluidic variable inertia flywheel 101 has numerous applications, including but not limited to, application means to create a constant angular velocity, and energy storage applications. One application area is energy storage for the electric grid, including off-peak storage and emerging alternative power generation such as wind turbines and solar power, amongst others. The ability to store a significant amount of energy at a constant angular velocity is important for these systems, such as the flywheel system 100 and presents an alternative to other options such as compressed air energy storage and batteries. Another application for the fluidic variable inertia flywheel 101 is hydraulic hybrid vehicles. The energy density of hydraulic energy storage is greatly increased by using the flywheel 101 to store energy, as both, a hydraulic accumulator, and in rotating kinetic form. Furthermore, by controlling how much energy is stored in gas compression versus rotating kinetic form, the hydraulic system pressure becomes independent of the quantity of energy stored.

Hydraulic Systems

An approach to improving the energy density of hydraulic systems with theoretical improvements of an order of magnitude revolves around an open accumulator concept. The open accumulator allows either air or oil to be added or removed from the accumulator, where the air passes through an air motor or compressor that is coupled to a hydraulic pump or motor. The energy density of compressed air is significantly higher than the gas in a conventional accumulator because of the higher pressure ratio. For example, the hydraulic accumulator in a hydraulic hybrid vehicle might operate between 35 MPa and 17.5 MPa, creating a pressure ratio of 2:1. In a compressed air system, the air expands in an air motor from 35 MPa to atmospheric pressure, creating a pressure ratio of 350:1. By allowing either hydraulic fluid or compressed air to enter or exit the open accumulator, the hydraulic system pressure can be controlled and is no longer a function of the quantity of energy stored. Implementing the open accumulator concept with reasonable efficiency is quite challenging. The prime challenges revolve around managing the heat transfer and air sealing at high pressure ratios to avoid extremely high temperatures during compression and extremely low temperatures causing icing during expansion.

Building on an aspect of the open accumulator, the energy storage density of a hydraulic system can be increased with storage in other energy domains. There are numerous domains of kinetic and potential energy storage, including alternatives such as pneumatic, electric battery, flywheel, mechanical spring, and thermal. Important factors influencing the selection of an auxiliary energy storage domain include energy density, power density, energy conversion efficiency from hydraulic energy, and operational factors including safety and environmental concerns.

Due to the high specific energy at approximately 325 kJ/kg, extremely high power density, and negligible environmental concerns, a further embodiment is directed towards augmenting the hydraulic system with a flywheel for energy storage. This can be accomplished by integrating the hydraulic accumulator and the flywheel into a single energy storage unit. The benefit of this approach is the natural crossing of energy domains by using the hydraulic fluid as a means of changing the inertia of the flywheel. As will be discussed below, varying the inertia of the flywheel may allow the hydraulic pressure to be controlled independently of the quantity of energy stored.

There are multiple ways to integrate a flywheel and a hydraulic accumulator including, but not limited to, radially spaced chambers acting as bladder, piston, or diaphragm accumulators and a single chamber rotated about the central axis with bladder, diaphragm, piston, or no separation between the gas and the liquid. Various embodiments described herein relate to a single cylindrical piston-style accumulator rotated about its central axis. In such embodiments, a cylindrical body of hydraulic fluid is maintained, unlike flexible separation methods which may result in varying geometry based on the centripetal acceleration of the fluids.

Figure 4:
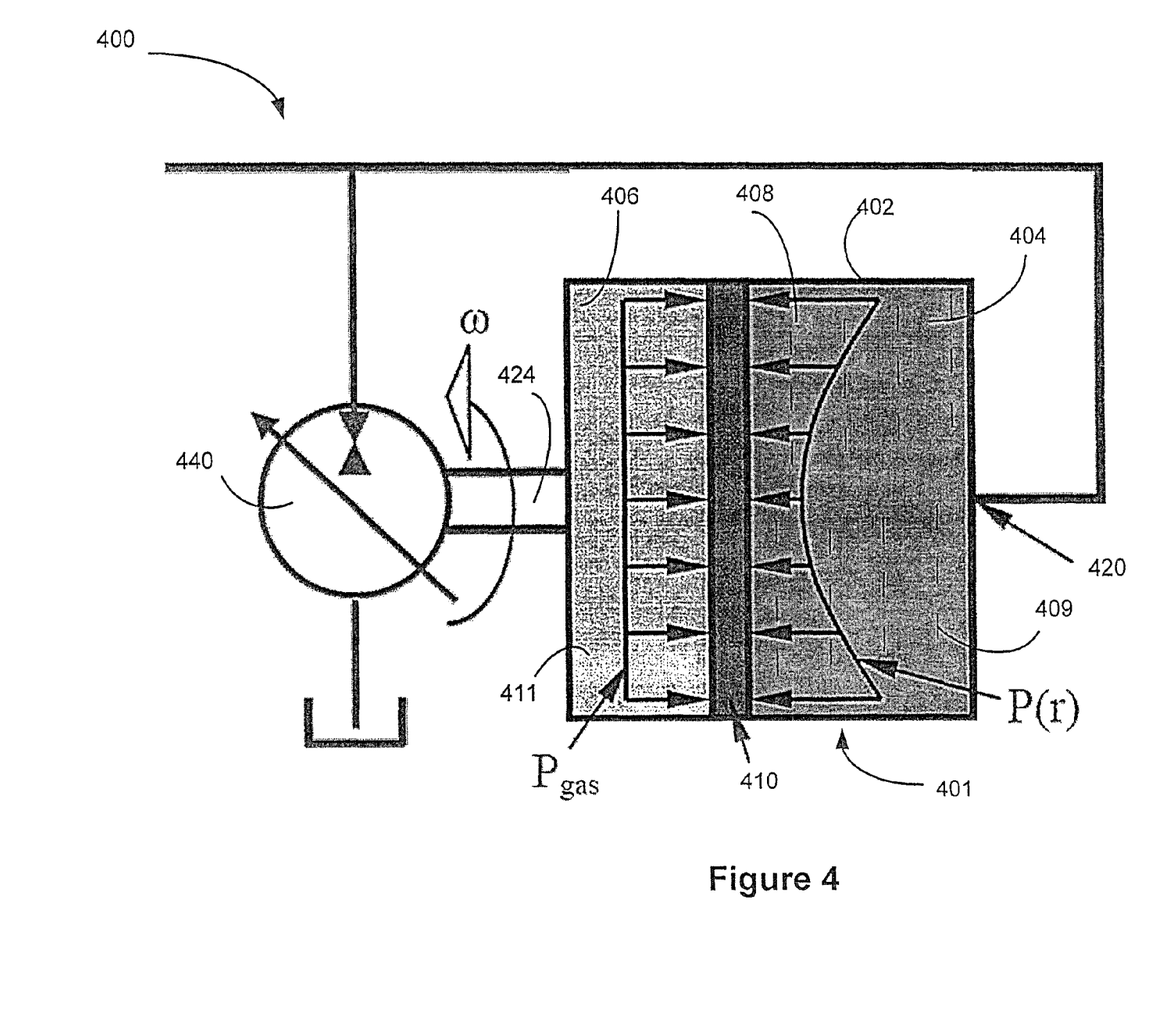
FIG. 4 illustrates a pictorial representation of a flywheel-accumulator system, in accordance with various embodiments of the present invention.

Referring now to FIG. 4, a flywheel-accumulator system 400 includes a flywheel-accumulator assembly 401 that is coupled to a hydraulic pump or motor 440 via a shaft 424. The flywheel-accumulator assembly 401 may include a cylindrical vessel 402 having an internal volume 404. A movable piston 410 disposed within the cylindrical vessel 402 divides the internal volume 404 into a first chamber 406 and a second chamber 408 that may be filled with a varying volume of hydraulic fluid 409. The hydraulic fluid may freely enter and exit the second chamber 408 via a port 420. In various embodiments, the hydraulic fluid 409 may move freely at atmospheric pressure. The first chamber 406, on the opposing side of the piston 410, may contain a gas 411, such as, but not limited to, nitrogen gas at a precharged pressure.

When hydraulic fluid 409 enters the second chamber 408 of the cylindrical vessel 402, the piston 410 moves axially towards the first chamber 406 and the gas 411 compresses. Because the density of the gas 411 is low, the centrifugal force created by the rotation of the flywheel-accumulator assembly 401 has little influence on the gas pressure distribution. However, the centrifugal force created by the flywheel rotation does have a significant influence on the radial pressure distribution of the hydraulic fluid 409, due to the higher density as described above with respect to FIGS. 1-3. Starting from Newton's second law and assuming steady-state operation with no fluid swirl, the force balance along the positive x-axis is described by:

$$\Sigma F_x = ma \quad (17)$$

where the forces are due to the pressure acting on each side of the infinitesimal fluid volume, m is the mass of the fluid volume, and a is the centripetal acceleration of the fluid volume. Note that during transient operation, tangential, coriolis, and sliding acceleration are also present. Substituting the forces on the fluid volume yields:

$$\left(P - \frac{dP}{2}\right)A_i - \left(P + \frac{dP}{2}\right)A_o + 2PA_s\frac{d\theta}{2} = ma \quad (17)$$

where P is the fluid pressure, dP is the change in pressure across the element, dθ is the arc angle of the volume element, $A_i$ is the area of the volume element on the inner radius, $A_o$ is the area of the fluid element on the outer radius, and $A_s$ is the area of the top and bottom sides of the element. Note that the sine of a small angle, dθ/2, has been substituted by the angle. Substituting the area of the surfaces into Equation 18 yields:

$$\left(P - \frac{dP}{2}\right)\left(r - \frac{dr}{2}\right)d\theta \cdot l - \\ \left(P + \frac{dP}{2}\right)\left(r + \frac{dr}{2}\right)d\theta \cdot l + 2Pdr \cdot l\frac{d\theta}{2} = \rho V(-\omega^2 r) \quad (18)$$

where r is the radius to the center of the element, dr is the radial length of the element, l is the thickness of the element, ρ is the mass density, V is the volume of the element, and ω is the angular velocity of the flywheel. The volume of the element can be expressed as:

$$V = rd\theta dr \cdot l \quad (19)$$

Expanding and simplifying Equation 19 and taking the integral of both sides yields:

$$\int_{P_S}^{P} dP = \int_0^r \rho \omega^2 r\, dr \qquad (20)$$

where $P_S$ is the system pressure at the inlet where $r=0$, yields an equation for the pressure of the fluid as a function of the radius.

$$P(r) = \frac{\rho \omega^2 r^2}{2} + P_S \qquad (21)$$

The above demonstrates that the hydraulic system pressure is a function of the angular velocity of the flywheel-accumulator assembly 401. To solve for the system pressure, a force balance analysis will be conducted on the piston 410. As shown in FIG. 4, pressure distributions on both sides of the piston 410 are shown. The parabolic pressure distribution on the hydraulic fluid side of the piston 410 is described by Equation 22, while a uniform pressure distribution is assumed for the gas side of the accumulator 401.

The forces on the piston 410, defined by the fluid pressures acting across the piston area, must be equal for the piston to be in equilibrium, as described by:

$$\int P(r) dA = \int_0^{r_o} \left(\frac{\rho \omega^2 r^2}{2} + P_S\right)(2\pi r\, dr) = P_{gas} A_{piston} \qquad (22)$$

where $r_o$ is the outer radius of the accumulator piston, $P_{gas}$ is the pressure of the compressed gas, and $A_{piston}$ the area of the piston. By making the assumptions of an ideal gas and isothermal compression, the pressure of the gas 411 can be further described as:

$$P_{gas} = P_{charge} \frac{V_{charge}}{V_{gas}} = P_{charge} \frac{l_g + l_h}{l_g} \qquad (23)$$

where $P_{charge}$ is the gas precharge pressure, $V_{charge}$ is the volume of the gas during charging, $V_{gas}$ is the current volume occupied by the gas, $l_g$ is the axial length of the gas volume, and $l_h$ is the axial length of the hydraulic fluid volume. The isothermal behavior assumption in the hydraulic accumulator is justified when an elastomeric foam is added to the gas chamber. Finally, substituting Equation 24 into Equation 23, integrating, and solving for $P_S$ yields:

$$P_S = P_{gas} - \frac{\rho \omega^2 r_o^2}{4} = P_{charge} \frac{l_g + l_h}{l_g} - \frac{\rho \omega^2 r_o^2}{4}. \qquad (24)$$

When hydraulic fluid 409 is added to the flywheel-accumulator assembly 401, the mass moment of inertia increases. Assuming the density of the hydraulic fluid is constant with radius, the mass moment of inertia of the flywheel-accumulator assembly 401 is described by:

$$I = I_{flywheel} + I_{fluid} = I_{flywheel} + \frac{mr_o^2}{2} \qquad (25)$$

where $I_{flywheel}$ is the inertia of the empty flywheel, $I_{fluid}$ is the inertia of the hydraulic fluid, and m is the mass of the hydraulic fluid. Substituting for the mass of the fluid in terms of the density and volume yields:

$$I = I_{flywheel} + \frac{\pi \rho l_h r_o^4}{2}. \qquad (26)$$

The model will use the finite-difference method to simulate the energy flows in the system. For a preliminary analysis, the energy losses in the hydraulic motor 440 will be neglected, allowing the torque of the hydraulic motor in the on-state to be described by:

$$T = \frac{P_S D}{2\pi} \qquad (27)$$

where D is the displacement of the hydraulic motor 440 in units of $m^3$/rev. The volumetric displacement of the idealized hydraulic motor 440 is described by:

$$Q_{P/M} = \frac{D}{2\pi} \omega \qquad (28)$$

The volume of hydraulic fluid displaced during time step i, when the motor 440 is on is described by:

$$V_{P/M}^i = Q_{P/M}^i \Delta t \qquad (29)$$

where $\Delta t$ is the time step. Using the volume displaced by the hydraulic motor 440, the length of the gas volume in the accumulator is found by:

$$l_g^i = l_g^{i-1} + \frac{V_{P/M}^i - Q^i \Delta t}{\pi r_o^2} \qquad (30)$$

where $l_g^i$ and $l_g^{i-1}$ are the thickness of the gas volume in the accumulator at the current and previous time steps and $Q^i$ is the volumetric flow rate into the entire energy storage device. The simulation will assume a constant regenerative power, thus the flow rate is described by:

$$Q^i = \frac{\text{Power}}{P_S^i} \qquad (31)$$

Both the moment of inertia and the angular velocity of the flywheel-accumulator 401 change at the same time, requiring the basic rotational form of Newton's second law, which states that the change in angular momentum is equal to the applied torque:

$$T = \frac{d(I\omega)}{dt} = \dot{I}\omega + I\dot{\omega} \qquad (32)$$

By discretizing the above equation using the finite difference method, the angular velocity at the next time step is:

$$\omega^i = \frac{T\Delta t + I^i \omega^{i-1}}{2I^i - I^{i-1}}. \qquad (33)$$

Energy flows in the flywheel-accumulator assembly 401 can be monitored during an operation to further illustrate different modes of energy storage. The operation, as described herein, is a constant power regenerative event such as lowering a load in the bucket of an excavator or braking in a hydraulic hybrid vehicle, as shown in FIG. 5.

Figure 5:
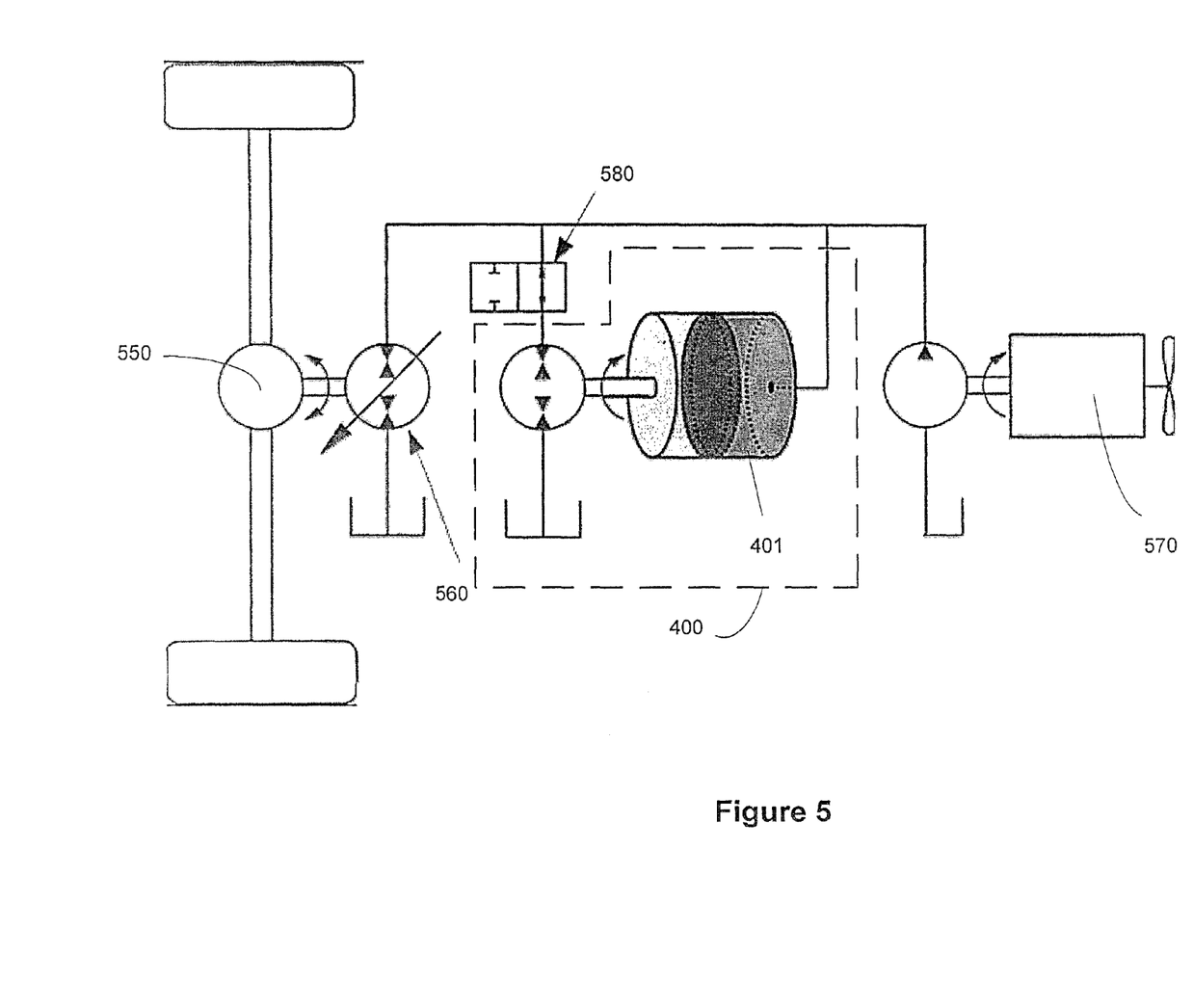
FIG. 5 illustrates a pictorial representation of an energy storage system that includes the flywheel-accumulator system implemented in a series hydraulic hybrid vehicle drivetrain, in accordance with various embodiments of the present invention.

FIG. 5 illustrates an energy storage system 500 that includes the flywheel-accumulator system 400 implemented in a series hydraulic hybrid vehicle drive train, in accordance with various embodiments of the present invention. In particular, FIG. 5 includes the flywheel-accumulator system 400 coupled to a hydraulic hybrid vehicle drive train, which includes a differential axle 550, a variable motor or pump 560, a prime mover 570, and a valve switch 580. While energy storage is discussed, energy extraction from the flywheel-accumulator system 400 follows the same principles. The purpose of the operation is to demonstrate the energy storage capacity of the flywheel-accumulator system 400 and thus the energy losses in the energy storage system 500 will temporarily be ignored. Three modes of operation for storing energy in the flywheel-accumulator assembly 401 will now be discussed.

In a first mode of operation, purely pneumatic energy storage will be considered where hydraulic fluid is directly added to the flywheel-accumulator assembly 401. For this mode, the on-off valve 580 is closed and the displacement of the motor 440 coupled to the flywheel-accumulator assembly 401 is set to zero to remove any influence of the variable displacement motor 560. This is the most efficient way to store energy in the energy storage system 500 as it requires no conversion across energy domains; however it provides limited energy density. In reference to FIG. 5, when hydraulic fluid is added to the flywheel-accumulator 401, the piston 410 moves to the left and the gas 411 is compressed, increasing the gas pressure. As described by Equation 27, the addition of hydraulic fluid 409 to the flywheel-accumulator assembly 401 increases the inertia. If no external torque is applied to the flywheel-accumulator assembly 401, the increase in inertia results in a decrease in angular velocity due to conservation of angular momentum.

The second mode of operation will consider purely rotational kinetic energy storage. In this operation mode, no hydraulic fluid 409 is added or removed from the flywheel-accumulator assembly 401, maintaining a constant moment of inertia; instead the hydraulic motor 440 is used to increase the angular velocity of the flywheel-accumulator assembly 401. To accommodate variations in the angular velocity of the flywheel-accumulator assembly 401, the variable displacement pump 560 is utilized. As described by Equation 25, an increase in the angular velocity of the flywheel-accumulator assembly 401 decreases the hydraulic pressure of the hydraulic system 400, decreasing the potential power of the hydraulic system 400. This mode of operation does introduce greater energy loss than the first mode as energy is converted from the hydraulic domain to rotating mechanical domain. However, the energy storage capacity is much greater in the rotating mechanical domain than the purely hydraulic domain represented by the first mode of operation.

By combining the first two energy storage modes of operation, high energy density and near constant hydraulic pressure can be achieved. Multiple control schemes can be used to store energy in the two domains. An approach that uses a fixed displacement motor 440 and seeks to maintain the hydraulic pressure within a specific range is implemented. When the hydraulic pressure exceeds a high threshold, the valve 580 to the fixed displacement motor 440 is switched on, resulting in the motor 440 increasing the rotating kinetic energy of the flywheel-accumulator assembly 401. Because the motor 440 has a fixed displacement, when the valve 580 is on, hydraulic fluid 409 may enter or exit the flywheel-accumulator assembly 401. When the hydraulic pressure drops below a low threshold, the valve 580 to the hydraulic motor 440 is switched off, and again all energy is stored in pure hydraulic form until the pressure again exceeds the high threshold.

The operations, graphs of which are shown in FIG. 6-8, begin with a low state of energy charge. The operations are then run until either the maximum pressure and/or the maximum angular velocity of the flywheel-accumulator assembly 401 is reached. The maximum pressure of the hydraulic system 400 will be 35 MPa (5000 psi), typical of high power hydraulic systems. Previous work found that the maximum energy density of a conventional accumulator, assuming isothermal operation, is achieved at an expansion ratio of 2.15, thus the precharge of the first chamber 406 will be 16 MPa. The maximum angular velocity of the flywheel-accumulator assembly 401 will be 25,000 rpm. To achieve this velocity, the speed of the hydraulic motor 440 may be reduced.

In various embodiments, the flywheel-accumulator assembly 401 may be sized to hold up to 10 liters. In some embodiments, the flywheel-accumulator assembly 401 may be made from a carbon fiber composite and sized to have a length of 0.15 m, a radius of 0.145 m, and a wall thickness of 20 mm. The predicted mass of the energy storage device or system 400 when empty is approximately 6.7 kg with a mass moment of inertia of 0.236 kg*m². The input power to the system 400 is set at a constant 25 kW. The common system parameters can be found in Table 1, while additional parameters and initial conditions for each operation mode are presented below. While some ambiguity is involved in the selection of the values in Table 1, the values approximate an appropriate size device for a hydraulic hybrid vehicle.

TABLE 1

System parameters for the simulation.

| Parameter | Variable | Value | Units |
| --- | --- | --- | --- |
| Power into the energy storage device | Power | 25 | kW |
| Radius of flywheel | $r_o$ | 0.145 | m |
| Axial thickness of flywheel | l | 0.15 | m |
| Inertia of empty flywheel | $I_{flywheel}$ | 0.236 | kg * m² |
| Gas precharge in accumulator | $P_{charge}$ | 16 | MPa |
| Density of hydraulic fluid | ρ | 876 | kg/m³ |
| Gear increase from pump/motor | R | 7 | unitless |
| time step | Δt | 1 | ms |

The computational model was run for the three different energy storage modes discussed above. For each operation, the primary results of interest are the system pressure, moment of inertia, and angular velocity during the energy storage event, as well as the total energy stored. FIGS. 6-8 illustrate graphical representations of the results of the modes of operation. FIG. 6 illustrates a graphical representation of system pressure and flywheel inertia during a first mode of operation in which the flywheel-accumulator system is used for pneumatic energy storage, in accordance with various embodiments of the present invention. FIG. 7 illustrates a graphical representation of angular velocity and hydraulic pressure of the flywheel during a second mode of operation in which the flywheel-accumulator is used for kinetic energy storage, in accordance with various embodiments of the present invention. FIG. 8 illustrates a graphical representation of system pressure, flywheel angular velocity, and flywheel inertia during a third mode of operation in which the flywheel is used for both pneumatic and kinetic energy storage, in accordance with various embodiments of the present invention.

Figure 6A:
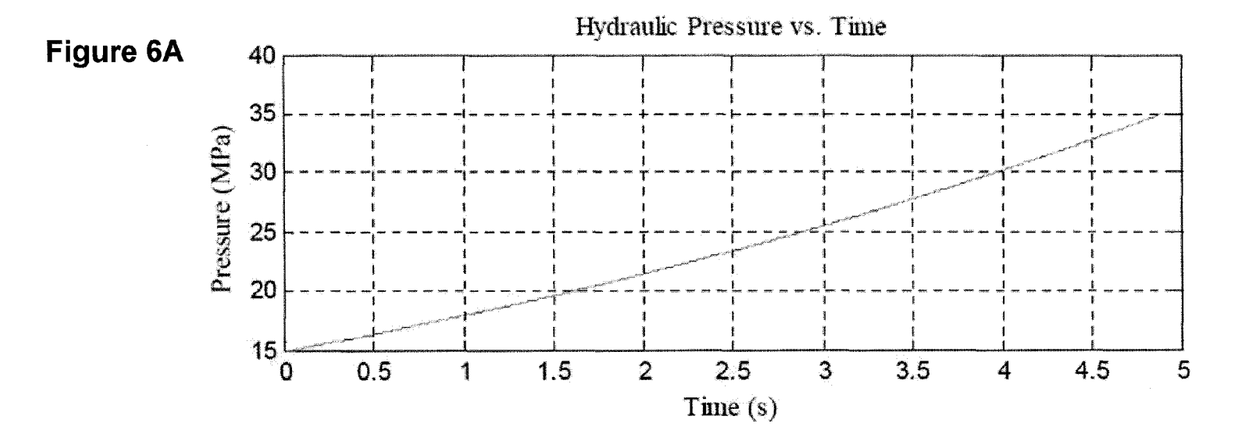
FIGS. 6A and 6B illustrate a graphical representation of system pressure and flywheel inertia during a first mode of operation in which the flywheel-accumulator system is used for pneumatic energy storage, in accordance with various embodiments of the present invention.
Figure 6B:
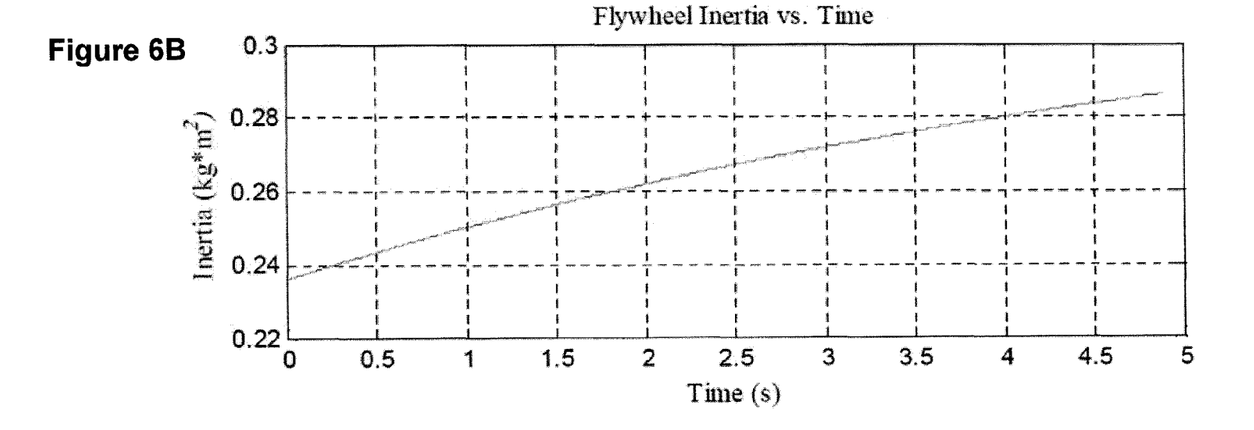

With respect to the first mode of operation and corresponding FIG. 6, for a baseline comparison, the first mode of operation considers only pneumatic energy storage. Throughout this operation, the angular velocity of the flywheel-accumulator assembly 401 is zero. At the start of the operation, the flywheel-accumulator assembly 401 has no hydraulic fluid 409. Charging the flywheel-accumulator assembly 401 to maximum pressure, as seen in FIG. 6A, takes 4.97 seconds with total energy storage of 124.1 kJ. As the flywheel-accumulator assembly 401 charges, the moment of inertia, seen in FIG. 6B, increases as the length of the gas volume in the flywheel-accumulator assembly 401 decreases from 0.15 m to 0.067 m.

Figure 7A:
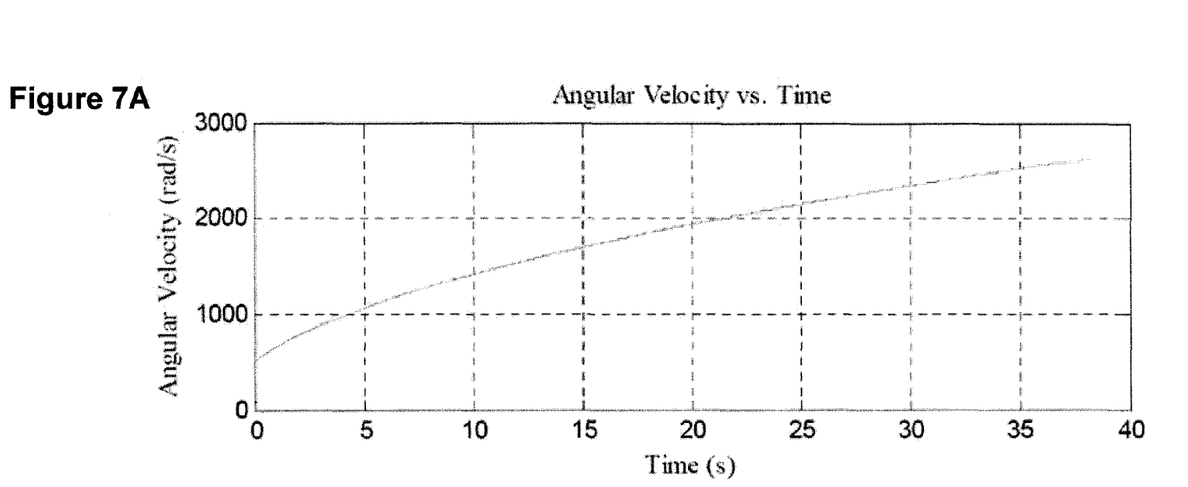
FIGS. 7A and 7B illustrate a graphical representation of angular velocity and hydraulic pressure of the flywheel accumulator during a second mode of operation in which the flywheel-accumulator is used for kinetic energy storage, in accordance with various embodiments of the present invention.
Figure 7B:
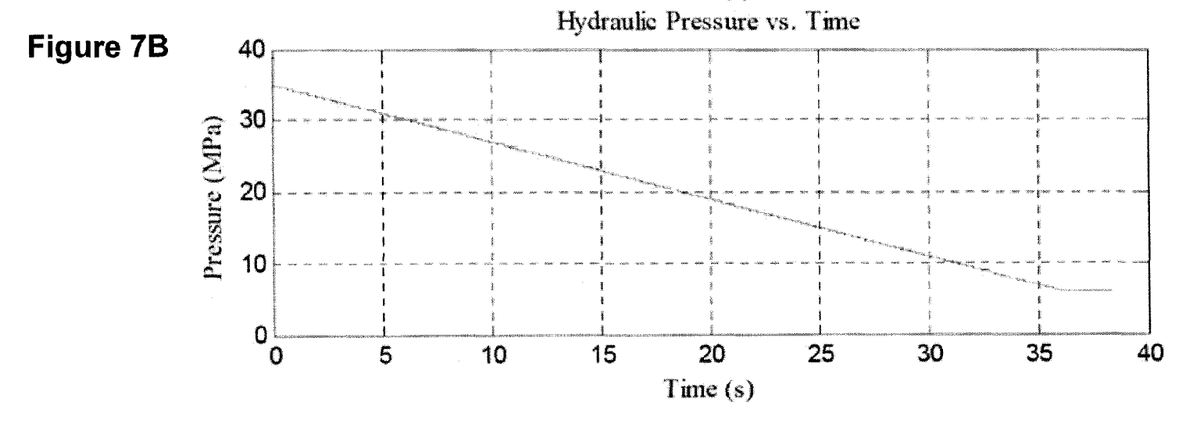

With respect to the second mode and corresponding FIGS. 7A and 7B, all of the energy is stored in purely kinetic form and no hydraulic fluid 409 is added to the flywheel-accumulator assembly 401. The hydraulic power coming into the system 400 is converted into kinetic energy with a variable displacement hydraulic motor 560 with a maximum displacement of 70 cm$^3$/rev. The initial angular velocity of the flywheel-accumulator assembly 401 is set to 500 rad/s to achieve adequate power density from the hydraulic motor 440. For this operation, the length of the gas volume is fixed at 0.067 m, which is the final condition of the first mode of operation. For this mode, the displacement of the hydraulic motor 440 will be continuously varied such that all of the input power is absorbed by the hydraulic motor 440 and no fluid is added or removed from the flywheel-accumulator assembly 401.

Using purely kinetic energy storage, the flywheel-accumulator assembly 401 stores 957.2 kJ of energy during a 38.3 second period before the angular velocity exceeds 25,000 rev/min. As expected, the angular velocity, as seen in FIG. 7A, increases with time. The influence of the centripetal acceleration on the hydraulic fluid is apparent in FIG. 7B, a plot of the system pressure with time. Recall that the system pressure is defined by the pressure at the center hydraulic inlet of the flywheel-accumulator assembly 401. From FIG. 7B, it can be noted that the system pressure ceases to decrease near 6 MPa. At low pressure, the power density of the hydraulic motor 440 decreases, preventing the kinetic energy storage from absorbing all of the input power.

Figure 8A:
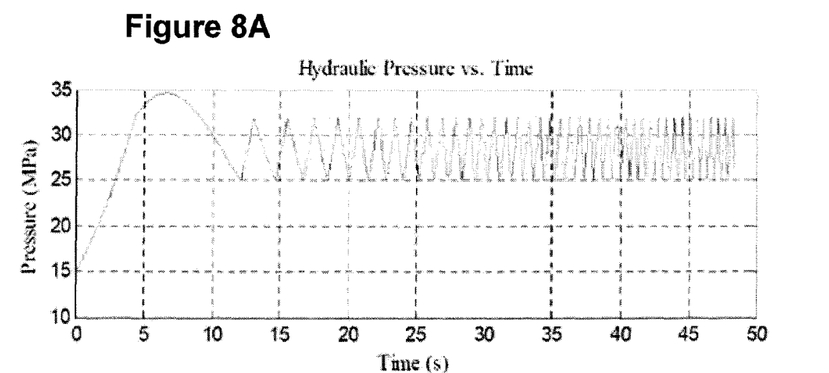
FIGS. 8A, 8B and 8C illustrate a graphical representation of system pressure, flywheel angular velocity, and flywheel inertia during a third mode of operation in which the flywheel-accumulator is used for both pneumatic and kinetic energy storage, in accordance with various embodiments of the present invention.
Figure 8B:
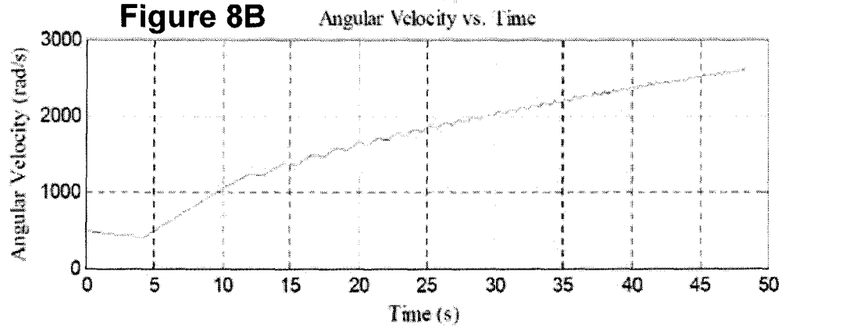
Figure 8C:
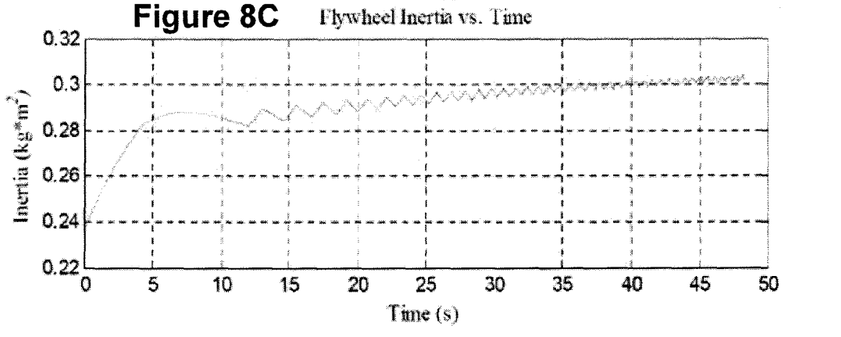

With respect to the third mode of operation and corresponding FIGS. 8A-C, the third mode of operation uses both pneumatic and kinetic energy storage. The operating parameters and initial conditions for this mode are presented in Table 2. For this simulation, the hydraulic motor 440 is treated as a fixed displacement unit and switched on and off based on high and low system pressure thresholds. As with the purely pneumatic energy storage case, the operation is started with the flywheel-accumulator assembly 401 empty of hydraulic fluid 409.

TABLE 2

The operating parameters and initial conditions of third mode energy storage simulation.

| Parameter | Variable | Value | Units |
|---|---|---|---|
| Pump/motor displacement | D | 42 | cm$^3$/rev |
| Initial angular velocity of flywheel | $\omega_i$ | 500 | rad/s |
| Initial thickness of the gas volume | $l_{g,i}$ | 0.15 | m |
| High pressure threshold | $P_{high}$ | 32 | MPa |
| Low pressure threshold | $P_{low}$ | 25 | MPa |

The third mode of operation results in 1208.6 kJ of energy storage during a period of 48.3 seconds. Plots of the pressure, angular velocity, and moment of inertia can be seen in FIGS. 8A-C. Due to the centripetal acceleration of the hydraulic fluid 409 causing a decrease in the hydraulic system pressure, more hydraulic fluid 409 can be added to the flywheel-accumulator assembly 401 than in the first mode where the flywheel-accumulator assembly 401 is at rest. The length of the gas volume at the end of the simulation is 0.038 m.

The on-off operation of the fixed displacement motor 440 is evident in the ripples in all three plots shown in FIG. 8. To minimize energy losses during motor switching, it is desirable to decrease the frequency of the ripples. The time that the motor 440 is on can be increased by decreasing the motor displacement and increasing the high pressure threshold. This can be accommodated by turning the motor 440 on at the start of the operation. As before, the motor 440 is switched off when the pressure drops below the low threshold and then operates in the standard manner. Using this modified control method, the motor displacement can be decreased from 42 cc/rev to 28 cc/rev and the high pressure threshold can be increased to 34 MPa. A plot of the system pressure using this method can be found in FIG. 8a.

For comparative purposes, a summary of the results of the three main operating modes is presented in Table 3.

TABLE 3

Summary of the results of the three energy storage operating modes.

| Parameter | First mode | Second mode | Third mode |
|---|---|---|---|
| Initial pressure (MPa) | 16.0 | 35.0 | 14.8 |
| Final pressure (MPa) | 35.0 | 5.9 | 26.2 |
| Initial moment of inertia (kg * m$^2$) | 0.236 | 0.287 | 0.236 |
| Initial moment of inertia (kg * m$^2$) | 0.286 | 0.287 | 0.304 |
| Operating time (seconds) | 5.0 | 38.3 | 48.3 |
| Pneumatic energy storage (kJ) | 124.1 | 0 | 169.6 |
| Rotating kinetic energy storage (kJ) | 0 | 957.2 | 1039.0 |
| Total energy stored (kJ) | 124.1 | 957.2 | 1208.6 |

The results of the operations demonstrate the increase in energy storage potential of the flywheel-accumulator assembly 401. In comparison to a purely pneumatic storage, used in a conventional hydraulic accumulator, the combined pneumatic and rotating kinetic energy storage increased the energy storage from 124 kJ to 1209 kJ, approximately a 10× increase in energy storage for the same volume. While the flywheel-accumulator assembly 401 used in the operations had an internal volume of 10 liters, it must be noted that the total system volume for either the pneumatic or the pneumatic-kinetic system would be significantly larger. Additional major components that add to the volume of the system 400 include a tank for the hydraulic fluid 409, the hydraulic motor, and the vacuum chamber/containment vessel that is used to absorb energy in case of a failure. Because the volume of these components is not specified, the results may be used to compare the various energy storage modes, but may not be used for calculation of the energy density or specific energy of the system 400.

An important consideration for any energy storage system is the maximum potential power. In a hydraulic system, the power is directly proportional to the system pressure. In a purely pneumatic operation, such as the first mode of operation, the system pressure increases with increasing energy storage. The change in pressure as a function of energy creates control challenges for applications such as hybrid vehicles. Furthermore, at low levels of energy storage, the potential power of the system is limited.

Using the purely rotating kinetic energy storage, such as the second mode of operation, the hydraulic system pressure decreases with increasing energy storage due to the centripetal acceleration on the hydraulic fluid 409 in the flywheel-accumulator assembly 401. The decrease in potential power with increasing energy storage is apparent in FIG. 7B, where the hydraulic motor 440 becomes power limited due to the decreasing system pressure. Note that the centripetal force on the hydraulic fluid 409 in the flywheel-accumulator assembly 401 creates a pressure gradient that increases with radius. If the hydraulic fluid 409 were removed from the outer rim, similar to a centrifugal pump, the hydraulic system pressure would increase with increasing energy storage. If purely kinetic energy storage is desired, a constant inertia flywheel with a hydro-static transmission would be a better choice to decouple the hydraulic pressure from the angular velocity of the flywheel.

Combining the pneumatic and rotational kinetic energy storage, such as in the third mode of operation, allows the hydraulic system pressure to be independent of the energy storage. During operation, the hydraulic system pressure can be controlled by switching on and off the fixed displacement hydraulic motor 440. If desired, a constant hydraulic system pressure could be achieved regardless of energy storage by using a variable displacement pump/motor. Another option is to make a fixed displacement motor have virtually variable displacement through the use of a switch-mode hydraulic circuit. Integrating pneumatic and rotational kinetic energy storage allows the displacement of the motor 440 to be decreased to meet the average power requirements, while hydraulic fluid 409 can be directly added or removed from the flywheel-accumulator assembly 401 to meet high power transient requirements. This is demonstrated by using the 28 or 42 cc/rev motor for third mode, while a 70 cc/rev motor was required for second mode operation.

Another interesting benefit of the combined pneumatic and rotational kinetic energy storage is the increase in quantity of both forms of energy storage over the individual systems. The operation demonstrated a 37% increase in the pneumatic energy storage from the first mode of operation to the third mode of operation and a 9% increase in the rotating kinetic energy storage from second mode of operation to third mode of operation. The quantity of pneumatic energy stored increases because the gas 411 can be compressed to a higher pressure for the same hydraulic system pressure due to the centripetal acceleration on the hydraulic fluid 409. The kinetic energy storage capacity increases because of the increase in the moment of inertia caused by the addition of hydraulic fluid to the flywheel-accumulator assembly 401.

The energy storage density and pressure management of the flywheel-accumulator assembly 401 are promising, but introduces multiple challenges. First, the dynamic balance of the flywheel-accumulator assembly 401 is critical for smooth operation at high speed. This requires tight tolerance control during manufacturing and likely a post-manufacturing balancing procedure. Second, for operation in mobile applications, changing the pitch, yaw, or roll of the vehicle creates a gyroscopic torque. The gyroscopic torque can be minimized through mounting the flywheel-accumulator assembly 401 to rotate about the vertical axis so changes in yaw to not result in an applied torque. Alternatively, gyroscopic torque can be eliminated by using two flywheels rotating in opposite directions or mounting a single flywheel in a gimbal. Third, as with any form of energy storage, in the event of a failure, the flywheel-accumulator assembly 401 can release energy in a dangerous manner. This hazard can be mitigated by using the vacuum chamber around the flywheel-accumulator assembly 401 as a containment unit and designing of the flywheel-accumulator assembly 401 to fail in an energy dissipating manner.

Three additional design challenges of the flywheel-accumulator assembly 401 relate to fluid swirl, rim stress, and the hydraulic fluid inlet. During angular acceleration of the flywheel, there is a tendency for the fluid 409 in the flywheel-accumulator assembly 401 to remain at the previous angular velocity, creating a velocity gradient in the fluid 409. The shearing of the fluid 409 due to this velocity gradient results in an energy loss. To alleviate this issue, baffles may be utilized inside the flywheel-accumulator assembly 401 to prevent fluid swirl. Possible designs that allow piston movement are interlocking or telescoping baffles. A second design challenge results from the rim stress in the flywheel-accumulator assembly 401 created by the internal fluid pressure and the centripetal acceleration of the rim. To provide perspective, the hydraulic fluid pressure acting on the rim can easily be found by substituting Equation 25 into Equation 22 and solving where $r=r_o$. Using the maximum hydraulic system pressure and angular velocity of 35 MPa and 25,000 rev/min respectively, the gas pressure is 63 MPa and the hydraulic fluid pressure at the rim is 98 MPa. Third, because hydraulic fluid 409 enters the center of the rotating flywheel-accumulator assembly 401, a live swivel may be utilized. The combination of high pressure and high angular velocity make the design of this swivel particularly challenging.

Accordingly, the present disclosure also relates to a flywheel-accumulator assembly for increasing the energy storage in hydraulic systems. By integrating a flywheel and an accumulator, energy can be stored in both pneumatic and rotating kinetic form. As disclosed herein, the flywheel inertia can be changed by adding or removing hydraulic fluid from the flywheel-accumulator, and energy storage capacity of a flywheel-accumulator system can be approximately 10 times greater than a conventional accumulator occupying the same volume. Furthermore, because energy can be stored in two domains, the hydraulic system pressure becomes independent of the quantity of energy stored, allowing the potential power of the hydraulic system to remain constant.

The significant increase in energy storage density and the ability to manage the hydraulic pressure make the flywheel-accumulator an enabling technology. A logical application for the technology is hydraulic hybrid vehicles where the low energy density of conventional hydraulic accumulators has been a barrier to compete with electric hybrid systems. The flywheel-accumulator assembly 401 could be coupled to the internal combustion engine, directly storing energy from the engine in the flywheel. The significant increase in energy density also enables a plug-in version of a hydraulic hybrid vehicle where the flywheel is charged from grid energy, allowing the vehicle to drive a limited distance without operating an internal combustion engine. Additional applications for the flywheel-hybrid include regeneration in construction, mining, agriculture, and industrial equipment that heavily rely on hydraulic systems. Other alternative energy applications for the technology include storing energy for wind turbines, tidal energy, wave energy, or other areas requiring energy storage.

The disclosed systems, methods, and technologies in general, should not be limited to specific implementations described herein. In addition, the disclosed systems, methods, and technologies should not be restricted to any specific implementations here described, for which other beneficial or alternate implementations may be substituted, in order to satisfy the organizational, functional or technology requirements imposed upon this disclosed system by any implementer. It will be apparent to those skilled in the art that modifications to the specific embodiments described herein may be made while still being within the spirit and scope of the teachings disclosed herein.

What is claimed is:

1. A fluidic variable inertia flywheel, comprising:
   a container having an internal volume;
   a shaft for rotating the container about a longitudinal axis of rotation;
   a movable member disposed within the container that separates the internal volume into a first chamber comprising a gas applying a first force on a first side of the movable member exposed to the first chamber, and a second chamber comprising a liquid applying a second force on a second side of the movable member; and
   the movable member moves along the longitudinal axis of rotation of the container;
   a port coupled to the second chamber for allowing the liquid to flow between the second chamber and a liquid reservoir tank.

2. The flywheel of claim 1, wherein the first chamber is vented to atmosphere.

3. The flywheel of claim 1, wherein the first chamber contains pressurized gas.

4. The flywheel of claim 1, wherein the second chamber contains a varying amount of liquid.

5. The flywheel of claim 1, wherein the amount of liquid contained in the second chamber corresponds to a position of the movable member.

6. The flywheel of claim 1, further comprising a resilient member biasing the movable member towards the second chamber.

7. The flywheel of claim 1, wherein the movable member is biased towards the second chamber by pressurized gas contained in the first chamber.

8. The flywheel of claim 1, the shaft capable of rotating the flywheel, the shaft further capable of being coupled to a displacement motor that controls the angular velocity of the liquid contained in the second chamber.

9. The flywheel of claim 1, wherein the fluidic inertia flywheel is self governing.

10. A method for maintaining constant angular velocity of fluid within a flywheel assembly, comprising:
    adjusting an angular velocity of the flywheel assembly comprising a container having a first chamber containing gas and a second chamber containing a liquid, the second chamber separated from the first chamber by a movable member disposed within the container;
    rotating the first and second chambers about a longitudinal axis of rotation;
    passively adjusting a position of the movable member for movement along the longitudinal axis of rotation towards the first chamber when the angular velocity of the flywheel assembly increases; and
    passively adjusting a position of the movable member along the longitudinal axis of rotation towards the second chamber when the angular velocity of the flywheel assembly decreases.

* * * * *